INVENTOR
H. C. THEUERER
BY Edwin B. Cave
ATTORNEY

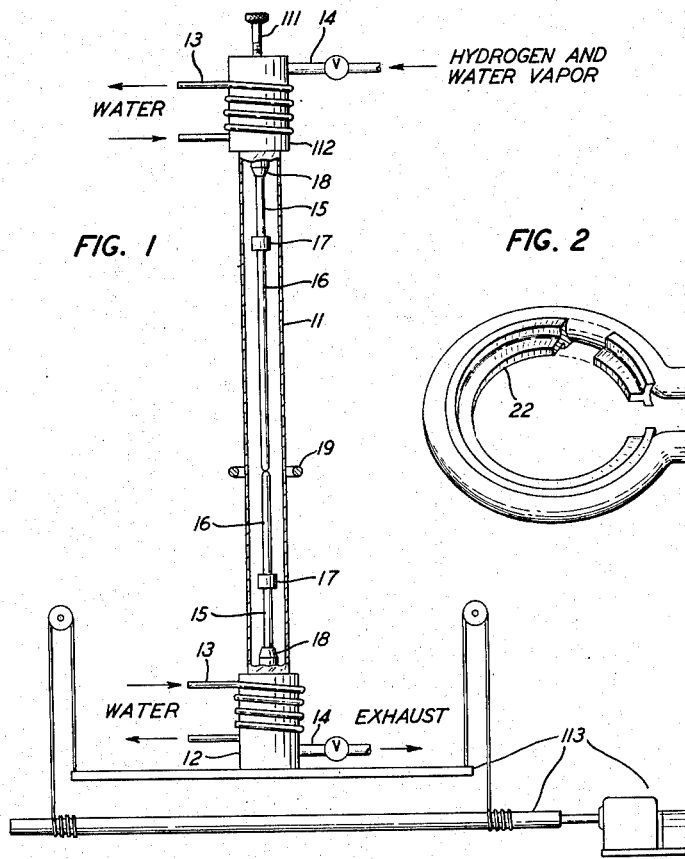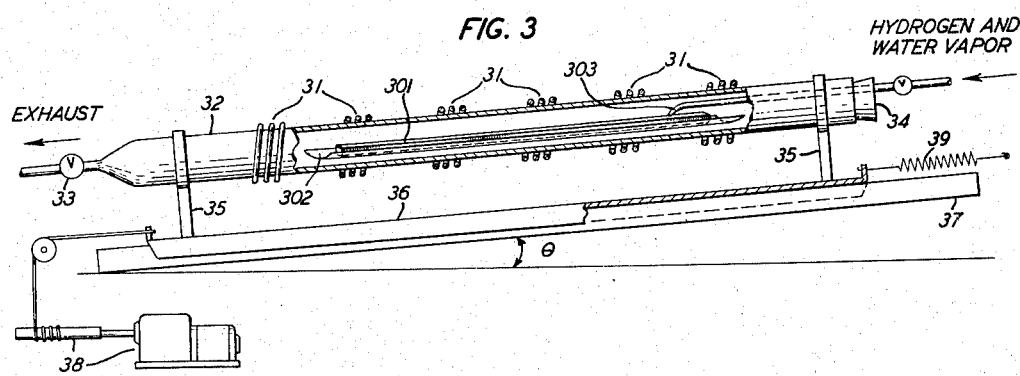

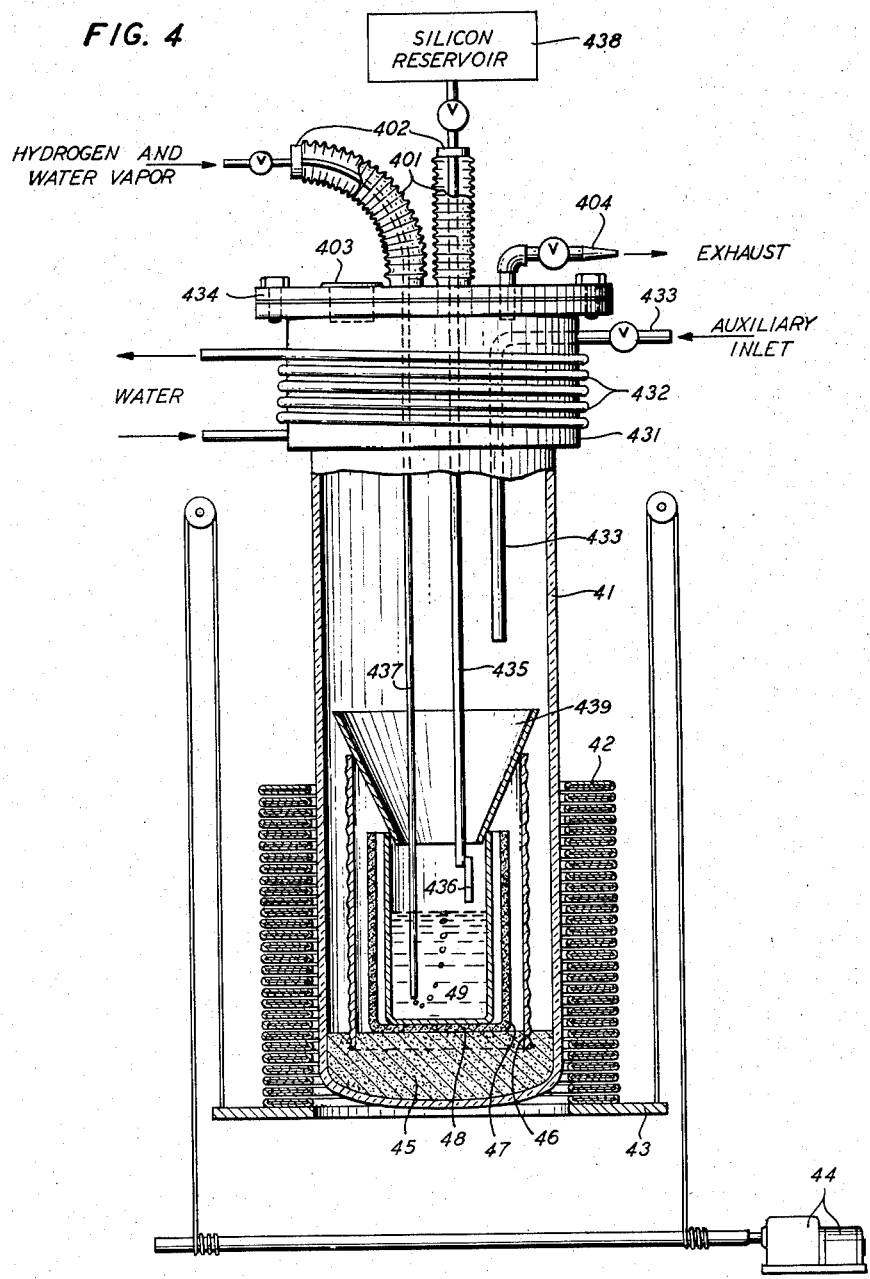

United States Patent Office 2,901,325
Patented Aug. 25, 1959

2,901,325
METHOD OF PREPARING SILICON

Henry C. Theuerer, New York, N.Y., assignor to Bell Telephone Laboratories, Incorporated, New York, N.Y., a corporation of New York Application July 22, 1955, Serial No. 523,897

10 Claims. (Cl. 23—223.5)

This invention relates to an improvement in methods for preparing pure silicon, and relates in particular to techniques for the removal of boron impurities from silicon. The application is filed as a continuation-in-part of the copending patent application of J. H. Scaff and H. C. Theuerer, Serial No. 236,662, filed July 13, 1951, now Patent No. 2,753,281.

The conductivity properties of elemental silicon are largely determined by trace concentrations of foreign materials present in the silicon. Close control of the kind and quantity of such impurities is necessary if good electrical characteristics and reproducibility of properties in successive silicon samples are to be obtained.

The silicon intended for use in semiconductor devices such as transistors, rectifiers, lightning arrestors, or photocells, for example, is generally required to be of a uniform, high-purity grade not ordinarily available from commercial sources. The degree of purity desired in silicon used for such semiconductor applications is commonly beyond the scope of conventional purification methods heretofore used in the chemical art. The invention described herein is pertinent to the production of extremely pure silicon particularly suitable for use in electrical devices of the kind mentioned.

Relatively pure silicon may be obtained either by initial formation from uncontaminated silicon compounds, or may be the product of refining processes working on the less pure elemental metal itself. Where effective techniques for the refinement of the starting materials exist, the synthesis of silicon of high purity is feasible. Thus, for example, the silicon obtained by a careful reduction of silicon tetrachloride with zinc or hydrogen has a purity commensurate with the care exercised to obtain reactants free of foreign substances.

The cost of such methods of silicon production is considerable if extensive refinement of starting materials is required. Much attention has been paid to processes for refining commercial grades of silicon produced by less painstaking methods. "Commercial grade" silicon, of approximately 96 percent purity, is prepared, generally, by carbon reduction of silicon dioxide in an electric arc. The impurities inherent in such material are predominantly iron, aluminum, boron and phosphorus. Some of these impurities may form a second nonsilicon phase in the bulk material, depositing at the grain boundaries of the metal. As taught in United States Patent 1,386,227, issued on August 2, 1921, to Frederick Mark Becket, crushing the material to fine particles and leaching in hydrofluoric acid may dissolve much of the second phase, often raising the purity of the remaining silicon to above 99 percent.

For further removal of contaminants, physical techniques have proved more effective than additional chemical processing of the silicon residue. The principles of two such physical methods, "normal freezing" and "zone melting," are described by W. G. Pfann in the paper entitled "Principles of Zone Melting," published in Transactions of the American Institute of Mining and Metallurgical Engineers, volume 194, pp. 747–753, in 1952. Both of the methods utilize the differential solubility of a solute, such as a contaminating impurity, in liquid and solid solvent, such as molten and solid silicon, to isolate the solute in one or the other of the two solvent phases in equilibrium. The efficiency of the processes, as described in the publication mentioned, is dependent in part on the distribution coefficient, $k$, of the solute or contaminant. The coefficient $k$ is defined as the ratio of the concentration of the solute in the solid solvent to its concentration in the liquid solvent at equilibrium. The greater the departure of $k$ for a solute from a numerical value of 1.0, the greater is the tendency for the solute to isolate itself in either the liquid or solid solvent phase, leaving the other phase present poorer in solute content. With the aid of such purification steps, the concentrations of Al, Fe, and P, which are impurities having $k$ values much different from unity, can be greatly reduced from their values in commercially available silicon. The $k$ value for phosphorus is about 0.3, for example; that of aluminum lies between 0.0015 and 0.0036. By selective fusion and solidification, these contaminating solutes may be effectively isolated in chosen portions of a silicon body. The remainder of the body, which has been thus purified, is the desired portion. The silicon with a high concentration of impurities may be discarded.

As the distribution coefficient of a contaminating solute approaches unity, however, the tendency of the contaminating solute to distribute itself preferentially decreases, rendering purification by a method based on such a distribution less efficient. Boron, with a distribution coefficient of about 0.8, is a silicon impurity relatively difficult to isolate using either normal freezing or zone refining techniques. The present invention, which comprises the exposure of molten silicon to atmospheres in which water vapor is present as a sole or component ingredient, effects the conversion of boron impurities to volatile compounds removable from the liquid silicon. The use of an atmosphere containing water vapor as a means for converting boron contaminants in silicon to substances which can be driven from the silicon with ease is particularly effective when used jointly with normal freezing or zone melting. These latter processes depend also on the production of a liquid phase of silicon, and an economy of time and effort may be effected by the practice of either of the refining steps in the beneficial atmospheres described herein. However, the contact of such atmospheres with liquid silicon, following the specification set out below, will bring about the removal of boron as a contaminant if done independently, as well as if done in conjunction with or in addition to other prior, subsequent, or concurrent refining processes.

In the accompanying drawings:

Fig. 1 is a front elevation, partly in section, of an apparatus found particularly effective for the purification of silicon simultaneously using a floating zone refining technique and the water vapor treatment described herein;

Fig. 2 is a perspective view, partly in section, of a device advantageously used with the apparatus of Fig. 1 to concentrate or focus high frequency electromagnetic waves useful for induction heating into a planar configuration of thin cross section;

Fig. 3 is a front elevation, partly in section, of an apparatus found particularly effective for the purification of silicon by zone refining in a crucible while maintaining a purifying water vapor atmosphere;

Fig. 4 is a front elevation, partly in section, depicting an apparatus found particularly effective for the treatment of silicon with water vapor, in which apparatus a refinement is also accomplished by subsequent normal freezing;

Figure 6:
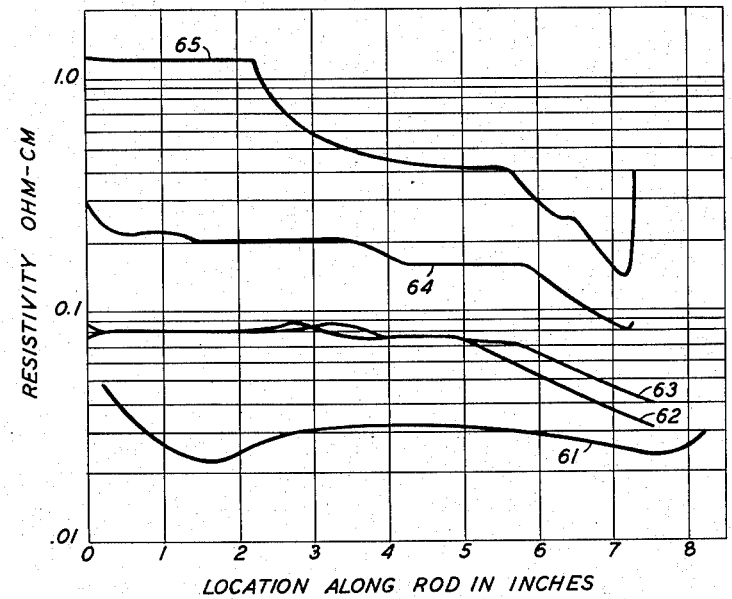
Figure 7:
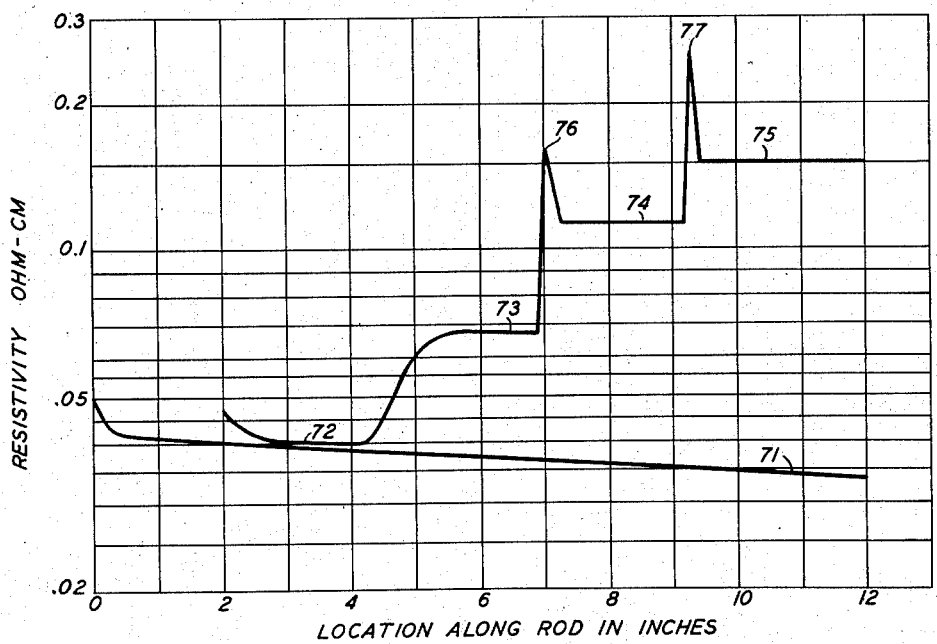

Fig. 6 presents plots of the resistivity of a silicon rod as a function of distance from one end along the rod, each curve being descriptive of the resistance characteristics of the same rod measured at various stages of treatment using a preferred example of the water vapor purification described in this application; and Fig. 7 presents plots of the resistivity of a silicon rod as a function of distance along the rod, successive portions of the curves plotted being descriptive of the resistance characteristics of the rod after exposure of different segments of the rod to atmospheres containing differing amounts of water vapor.

In Fig. 1 is shown a tubular body 11, conveniently having quartz walls, and being one inch in approximate diameter and about 20 inches in length. At the ends of the tube 11, caps 12 and 112, conveniently made of brass, are fitted. Each cap 12 and 112 is wrapped with water-carrying cooling coils 13, and is fitted with a side arm 14 which may serve as an inlet or exhaust for gas being passed through the tube 11. Within each end cap 12 and 112 is mounted a chuck 18, the chuck in the upper cap 112 being further equipped with means, including a threaded screw 111, which permit raising or lowering of the upper chuck along the axis of the tube 11. Grasped in the chucks 18 are support rods 15 of a refractory material such as silica, each being conveniently about six inches in length. The support rods 15 terminate in hollow cylindrical cups 17 which are advantageously fashioned of the same material as constitutes the support rods 15 and which are usually made integral with said rods 15. The hollow cups 17 receive a silicon rod 16, conveniently held in place in the cups 17 with a refractory cement such as a mixture of silicon dioxide and sodium silicate.

Concentrically surrounding the tube 11 is an induction heating coil 19, which, when carrying high frequency current, serves to heat and liquefy that portion of the silicon rod 16 suspended within the plane of the circumferential coil.

In the operation of the above-described device, the principles of which are more fully explained in the copending application of H. C. Theuerer, Serial No. 326,561, filed December 17, 1952, a molten zone is established in the vertical rod 16. Surface tension forces serve to keep the rod integral, even though a portion of the rod is liquefied. Zone refining can thus be accomplished without confinement of the silicon in vessels which might be a source of contamination.

Before initiation of the zone melting process, the silicon rod 16 is usually composed of two separate segments. The lower portion is a length of previously prepared single crystal silicon held in the lower end cap 12. In the corresponding assembly at the upper end of the tube 11, the silicon to be purified is attached. By vertical movement of the upper chuck 18, using the screw 111 in the upper end cap 112, the upper portion of the silicon rod 16 can be moved relative to the lower portion as to form a gap of desired size between the two segments of the rod.

When the zone melting process is begun, a torch or resistance heater is used to preheat rod 16 where the two segments abut. Induction heating is then applied, and when a molten region is formed, the rod segments are joined with the molten zone between them. By means of a mechanism 113, comprising a motor, gear box, and vertically movable platform, the entire apparatus may be lowered through the plane of the fixed induction coil so that the liquid zone initiated at the joinder of the seed crystal and the sample to be purified proceeds upward through the sample. The length of the support rods 15 and the passage of water through the cooling coils 13 prevent heat from the molten zone from affecting wax seals which may be used in part to fasten the caps 12 and 112 to the tube 11. Recrystallization, first taking place at the seed crystal-sample junction, brings about the formation of a single silicon crystal built up from the seed crystal, though the original silicon sample may be initially polycrystalline.

The silicon rods to be purified in the apparatus may be obtained by a sintering of powdered commercial silicon. The process is taught by R. Emeis in Zeitschrift für Natürforschung, volume 9A, book 1, published in 1954, at page 57. Conveniently, the rods may be produced also by a hydrogen reduction of silicon tetrachloride with deposition of the silicon on a filament. This process is described in an article by Rudolf Hölbling in Zeitschrift für angewandte Chemie, volume 40, published in 1927, at page 655. The use of a purification step subsequent to the formation of the silicon material permits the use of reactants which have not been extensively purified prior to reaction. However, the greater the attention given to purity before performing the reduction reaction, the purer the resultant product. Less prolonged use of the water vapor treatment may be required to remove impurities, in consequence.

In a preferred application of the apparatus of Fig. 1 to water vapor purification of silicon, hydrogen conveniently saturated with water vapor at 0° C. was admitted into the tube 11 through the inlet 14 in the upper end cap 112. The gas was removed through the corresponding outlet 14 in the lower cap 12. A flow of about 1 liter per minute of gas was maintained. The lowering mechanism 112 was so adjusted to give a movement of the silicon sample 16 through the induction heater 19 at a convenient rate of one-tenth inch per minute.

Fig. 2 shows a more detailed view of a coil, which may be used as the coil 19 of Fig. 1, useful for heating metallic materials by induction in apparatus like that shown in Fig. 1. The coil comprises a hollow circularly-bent tube 21, conveniently of copper tubing one-fourth inch in outside diameter, with a wall thickness of about one-sixteenth inch. Soldered along the inner circumference of the circularly bent tubing 21, is a fin 22, conveniently also of copper. The fin 22, whose outside diameter matches the inside diameter of the circle formed by the tubing 21, has a cross section, as shown, which is roughly T-shaped. One arm of the T furnishes a surface solderable to the tubing 21, while the other perpendicular arm, extending radially inward from the curved tubing 21, tends to define a radial plane within the circle formed by the tubing 21.

In practice, the ring of tubing 21, with its attached fin 22, is positioned so that it circumferentially surrounds the metallic body to be heated. When the tube 21 is connected with a source of high frequency current, the fin 22 acts to concentrate the radiation passing through the conductor 21 in such a manner that only a thin ring of the metal suspended within the plane of the circularly bent tubing 21 and fin 22 is heated. Such a focussing of the radiation permits more intense heating of a portion of the metal being so heated. When used in apparatus such as that shown in Fig. 1, use of the fin also helps to prevent the formation of a molten zone so large as to disrupt the surface-tension forces maintaining an integral column of semiconductor material. Such tapered coils are particularly useful when small diameter rods are being refined, as they produce a molten zone of small dimensions in such rods. With rods of diameters comparable to ¼ inch or more, focussing coils are usually unnecessary.

For inductive heating of the rod processed in the floating zone apparatus shown in Fig. 1, a current with a frequency of 5 megacycles per second is most advantageously used. High frequencies of this magnitude give good heating of polycrystalline material, as well as of single crystal silicon. Further, less stirring and agitation of the molten zone is observed than when presently available generators of lower frequencies are used.

In Fig. 3 is shown a more conventional zone refining apparatus modified to permit simultaneous water-vapor purification. In the figure, induction heating coils 31, conveniently having an inside diameter of one and seven-eighths inches, are wound around a tube 32 made of a refractory material such as quartz, and conveniently being about one and one-half inches in outside diameter. The coils in the specific embodiment pictured are clustered along the tube 32 so that each series of coils will heat a section conveniently one and one-fourth inches long. The lateral spacing between the centers of successive coil clusters is about three and one-half inches for the apparatus shown. The tube 32 is constricted and fitted with a stopcock 33 at one end, and fitted with a stopper 34, conveniently made of rubber, at the other. A hollow tube 303, conveniently made of silica, penetrates the stopper 34. The tube 303, about one-fourth inch in outside diameter and tapered to about one-sixteenth inch at one end, is positioned to play a stream of gas over the surface of a boat 301 resting within tube 32.

The tube 32 is clamped securely by circular clamps 35, which are in turn attached to a horizontally movable platform 36 which rests on a track 37. The platform 36 may be moved along the track 37 in one direction by means 38 comprising a motor and gear box, and returned to the starting position at the other end of the track 37 by the action of an extendable spring 39. A tripping mechanism, not shown, permits the spring 39 to pull back the platform free of the action of the mechanism 38, and then resets said mechanism 38 to initiate another cycle of platform movement against spring tension.

The passage of a molten zone through a horizontal silicon ingot during zone refining in a crucible tends to taper the ingot by accumulation of the silicon being refined in those portions of the ingot last liquefied. This phenomenon, known as "matter transport," has been discussed and analyzed in a paper by W. G. Pfann entitled "Change in Ingot Shape During Zone Refining," published in the Journal of Metals, volume 5, pp. 1441–1442, in November 1953. As there taught, such tendency for matter transport can be reduced by inclining the silicon ingot upward in the direction of zone movement. In the apparatus shown in Fig. 2, zone movement is from left to right, as drawn, and the right end of the apparatus is raised by inclining the track 37 from the horizontal. The entire apparatus, including the crucible 301 containing the ingot, is then similarly inclined.

A convenient angle of inclination, $\theta$, is obtained by raising the track 37 three inches out of the horizontal at the right end. As the track 37 in the apparatus shown has a length of 27 inches, the angle of inclination, $\theta$, is defined as slightly greater than 6°. The best value for such an angle of inclination is usually most easily found by experiment, as the value is dependent on the specific design of the refining apparatus and on the material being refined.

Within the tube 32, which in the pictured example has a convenient over-all length of about forty-two inches, is the semicylindrical silica boat 301, earlier mentioned. For a tube 32 of the length given, a silicon boat having the following dimensions has been used to advantage: width—one inch; height—three-fourths inch; length—fifteen inches; thickness of wall—one-sixteenth inch.

In operation, the boat 301 is filled with powdered silicon to be refined. Because of the bulky volume of the powdered material, it is found convenient to load the boat with more dense slugs of silicon, formed by compression of the powder. A small piece of lump silicon is added to the boat, and the whole inserted into the tube 32 after removal of the stopper 34. The boat or crucible 301 is advantageously set on a silica paddle 302, and the boat and paddle laid on the floor of the tube 32. Use of a paddle 302 facilitates loading and unloading. The paddle, further, serves as an insulating or heat-dissipating layer, tending to prevent a possible tendency for the tube 32 to soften because of the direct transmission of heat thereto from the boat 301 containing molten silicon. Interposition of the silica paddle 302 aids in dissipating heat from the crucible 301, thus reducing the chance of causing cohesion between the boat 301 and tube 32 which might arise if the two were in direct contact.

After loading, the stopper 34 is reset into the tube 32. A stream of hydrogen is passed through the tube 32 from the inlet tube 303 to the exhaust 33, and a high frequency current is passed through the coils 31. Inductive heating of loose, powdered materials is inefficient, as is heating of even the relatively more dense compressed slugs, so the high density silicon lump earlier mentioned, which is more subject to being inductively heated, is put in the boat 301 and so positioned as to be heated by one of the coils. Initial heating of the lump with a resistance heater may be used to speed fusion. Once liquefied, the now-molten material conducts sufficient heat to melt adjacent portions of the silicon powder and induction heating of the resultant, more dense, liquid metal is easily brought about.

The platform 36 is initially set, for convenience, at that one of the two extreme positions of the travel cycle for which the spring 39 is under least tension.

With an apparatus of the type pictured in Fig. 3, four molten zones, and often a portion of a fifth, can be created in the silicon contained in the boat 301. The mechanism 38 is started and the platform 36, with the tube 32 attached thereto by the rigid supports 35, is drawn through the fixed coils 31 at a convenient rate of one-fourth inch per minute. The silica boat, filled with silicon, is thus passed through the coils, a molten zone being formed at several positions in the silicon, with material liquefying or crystallizing as it passes into or out of the space within the induction coils.

A three and one-half inch horizontal displacement of the tube 32 and the boat 301 relative to the coils 31 is usually effected before the tripping mechanism permits the spring 39 to draw back the platform 36 along the track 37 and resets the mechanism 38 for the start of another refining cycle. In this way, a molten zone formed under one of the coils is carried three and one-half inches from left to right along the length of the ingot during a refining cycle. When the spring mechanism is tripped, that molten zone is now newly stationed under the next coil to the right of the coil under which the zone started during the previous cycle. The process is repeated with new molten zones being formed at the left end of the crucible 301, moving through the ingot, and disappearing at the right end of the ingot. If, as is found useful in the operation of the specific apparatus shown in Fig. 3, the cycle is repeated about 20 times, the effect is that which would be achieved by passing the entire length of the bar through a single coil 20 times, bringing about some purification on each pass through the coil.

During the zone refining process, a hydrogen and water vapor mixture is admitted into the tube 32 through the hollow tube 303. The tube 303 is constricted at that end inside the chamber 32. It may also be bent downward slightly in the direction of the boat 301. These modifications of tube 303 are to promote a streaming of the hydrogen-water vapor mixture over the surface of the silicon melt in the boat 301. Such streaming tends to prevent localized depletion of water vapor in the purifying amosphere. Uniform purification of the ingot being refined is thus enhanced.

Another design, not shown, of a tube similar in function to tube 303, extends the length of the boat 301 and is perforated in several places to permit a play of the refining atmosphere on the boat along its entire length.

The exhaust gas leaves the tube through the stopcock 33. Again, a rate of flow of gas of one liter per minute has been found convenient. The hydrogen is previously saturated with water vapor at a temperature of, conveniently, 10° C. Removal of boron according to the principles of the new technique goes on concurrently with purification accomplished by multiple zone refining passes.

In Fig. 4 is shown an apparatus which has proved particularly useful in the application of water vapor purification to silicon, coupled with purification brought about by normal freezing. The drawing shows a tube 41 of a refractory material such as silica, the lower portion of which is concentrically surrounded by induction heating coils 42. The coils are mounted on a platform 43 which is capable of vertical movement with respect to the fixed tube 41. Means 44, comprising a gear box and motor, are provided to control the movement of the platform. Within the tube 41 is a heat shield 46, preferably of a refractory material such as "Alundum," serving to minimize heat loss by transfer from a graphite heater crucible 47 to more radially outward areas. The graphite crucible 47 is that part of the apparatus directly heated by operation of the induction coils 42, and holds a thin-walled silica crucible 48 in which a silicon melt 49 in turn is held. All the parts, the shield 46 and nested crucibles 47 and 48, rest on a bed of refractory material 45, conveniently sand, at the bottom of the tube 41.

At its upper extremity, the tube 41 is sealed with a suitable cement into a metal furnace head 431, which latter is wrapped with cooling coils 432 and is equipped with an inlet 433 for the admission of gases into the apparatus. The top of the furnace head 431 is sealed with a cover 434 bolted to the furnace head. A tight seal is made with gaskets, not shown, of lead or other suitable material. Extending through the cover 434 and capable of extension into the silicon melt 49 is a silica tube 435, equipped with a silica tamp 436. The tube 435 is used for introduction of powdered silicon from a reservoir 438 into the melt 49. A silica funnel 439 aids in directing the powdered material into the crucible 48. A second silica tube 437 is used to bubble hydrogen and water vapor mixtures through the molten silicon 49. Both tubes 435 and 437 are fitted into the cover 434 by means of flexible rubber sleeves 401. These sleeves 401 are fastened at their upper end to stoppers 402 of rubber, or other suitable material, which tightly surround the tubes passing through them. At their lower end, the flexible sleeves 401 are cemented or wired to metal tubes, not shown, which project through the cover 434. In this manner, a gas-tight seal is maintained which still permits vertical and some lateral movement of the silica tubes 435 and 437.

Finally, the cover 434 is equipped with a viewing port 403 for visual inspection of the melt 49 or determination of the melt temperature by optical means. There is also an exhaust outlet 404 for the escape or withdrawal of vapors from the apparatus.

In operation, crucible 48 is partly filled with powdered silicon and the apparatus is sealed. While hydrogen is admitted through the auxiliary inlet 433 at an advantageous rate of flow of about one liter per minute, the melt 49 is brought to temperature by the passage of a high frequency current through the induction coils 42. A mercury arc generator with a 25 kilocycle per second frequency output has been found advantageous for heating. The melt is observed through the port 403 and the flow of current through the heating coils regulated so that the temperature of the melt, between 1450° C. and 1550° C., is high enough to prevent the formation of solid at the melt surface.

Upon melting, the bulky powdered silicon is reduced considerably in volume. This volume reduction, not to be confused with the more moderate volume decrease undergone by silicon in passing from a compact solid phase to a liquid phase, is due merely to the disappearance of the granular material. The powder is of low density because of voids between the granules, and fusion acts here to render the silicon more compact.

When the original contents of the crucible 48 are partially or wholly liquid, then additional powdered silicon may be admitted stepwise from the reservoir 438 through the silica tube 435 to the melt 49. A silica tamp 436 is used to mix the fresh charge with the molten material already present. Stepwise addition of small amounts of the powder is preferred, as such inhibits caking of the fresh material and facilitates liquefaction of the charge. Addition of fresh powder is usually stopped before the level of the melt is nearer than one inch to the top of the crucible 48.

After a full molten charge is obtained, hydrogen saturated with water vapor at a convenient temperature, such as 10° C., is then passed through the tube 437 and bubbled into the molten silicon at a rate of about one liter per minute. A slow stream of pure hydrogen or mixed hydrogen-water vapor may also be continuously fed through the inlet 433. A favorable atmosphere can thus be maintained without the necessity of passing so much gas through the melt 49 as to cause spattering. This auxiliary gas also provides a factor of safety in case the tube 437 should become clogged.

The treatment is continued, in this embodiment of the invention, for a period of about four hours or longer, depending on the degree of purification desired. Purification of the melt is brought about both at the liquid-gas interface at the melt surface, and within the body of the melt by the passage of the hydrogen-water vapor mixture therethrough.

Finally, upon conclusion of the process, the tubes 435 and 437 are removed from the melt 49. Then the platform 43 and coils 42 are raised at a slow and steady rate, conveniently one-eighth inch per minute, relative to the tube 41, by means comprising the motor and gear box 44. This permits solidification of the melt from the bottom upward, with those impurities which are preferentially soluble in liquid silicon being concentrated and eventually frozen out in those portions of the silicon ingot last frozen. This is an example of normal freezing used to purify silicon.

Figure 5:
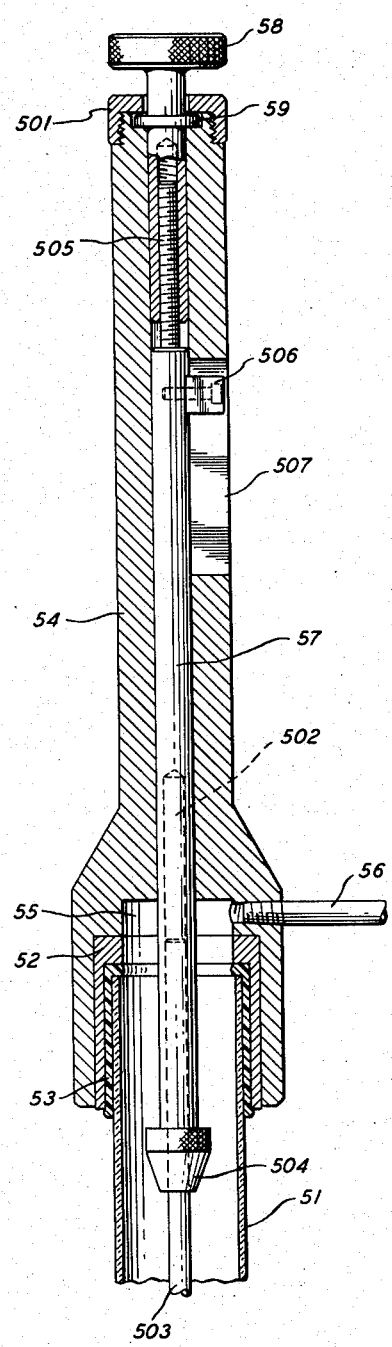
Fig. 5 is a front view, partly in section, of a device for altering the length of a vertically suspended semiconductor ingot to compensate for anomalies in the diameter of the ingot, said anomalies arising from volume changes in the semiconductor material upon fusion or solidification.

Fig. 5 is a detailed drawing of one modification of several devices which have been used as end caps similar to the one shown as upper cap 112 in Fig. 1. In the figure, a tube 51, such as the quartz tube 11 of Fig. 1, is fitted with a metal rim 52, conveniently of brass. The rim 52 is joined to the tube 51 with an adhesive seal 52, conveniently of picein wax. The rim 52 is fitted into a machined cavity 55 in a hollow metal cylinder 54, also conveniently of brass. A hollow metal inlet or outlet tube 56 is entrant into the cavity 55, providing a free path into the interior of tube 51 through the cylinder 54.

A metal shaft 57 is tightly fitted into the hollow cylinder 54 so that when said shaft 57 is lubricated with a material such as stopcock grease an essentially gas-tight seal between the shaft 57 and cylinder 54 is created. The shaft 57 is threaded at its upper end 505, and screws into a rotatable metal fitting 58 secured to the cylinder 54 by a metal screw-on cap 501. The cap 501 and a flanged portion 59 of the fitting 58 inhibit motion of the fitting 58 other than rotary motion. A protruding metal stud 506 fastened to the middle portion of the shaft 57 fits into a slot 507 machined in the side of the cylinder 54. Said slot 507 is only wide enough to permit a fit of the stud 506 therein, preventing rotation of the shaft 57 in the cylinder 54. The length of the slot 507 is such as to allow considerable vertical play, conveniently about one and one-half inches, of the shaft 57 within the cylinder 54.

At its lower end 502, the shaft 57 is hollowed to accommodate a rod 503 which may be, as suggested in Fig. 1, a support rod of silica. By vertical movement of the rod 503 in the hollowed portion 502 of shaft 57, the length of rod 503 extending into the tube 51 can be roughly adjusted. The rod 503 may then be secured in position by tightening a chuck 504.

By use of the device of Fig. 5 or another similar device, the vertical movement of the support rod 503 in the tube 51 may be finely controlled. Rotary motion imparted to the threaded fitting 58 is translated into vertical reciprocal movement of the shaft 57 because of the restraint to shaft rotation imposed by the slot 507 and stud 506 fitting therein. The slot 507 permits only vertical movement of the stud 506 and shaft 57. Said vertical reciprocation of the shaft 57 causes an identical motion in the support rod 503 held rigidly thereto by the chuck 504.

When used in apparatus such as that shown in Fig. 1, the support rod in turn is cemented to a silicon bar being refined. Upon formation of a molten zone in the silicon rod, the volume decrease in the silicon caused by melting, which volume change results in a reduced diameter of the silicon bar in its liquid portion, can be compensated by a shortening of the total length of the silicon bar using the apparatus of Fig. 5. Also, before solidification of the last zone, volume discrepancies in the silicon bar expected from expansion upon solidification can again be compensated by an appropriate length adjustment.

Such volume changes upon change of state and the problems they pose in other methods of zone refining are described in the paper by W. G. Pfann, entitled "Change in Ingot Shape During Zone Melting," published in the Journal of Metals, volume 5, November 1953, at pages 1441 and 1442.

In Fig. 6, the resistance characteristics of a silicon rod purified using the apparatus of Fig. 1 are shown graphically. The curves show the resistivity of the silicon rod measured in ohm-centimeters and plotted on the ordinate on a logarithmic scale. The units of the abscissa are inches, and the variable plotted is the distance from the end of the rod at which a molten zone is started through the rod. In curve 61 is shown the resistivity of a silicon rod containing boron impurity introduced into the material upon its formation by mixing boron trichloride with silicon tetrachloride and reducing both compounds with hydrogen. One zone-melting pass has been made in the rod prior to the measurements. By passing a molten zone through the length of the rod, the concentration of the impurity in the rod can be rendered fairly uniform, as indicated by the long flat portion of the curve 61. The zone pass, or movement of the silicon rod through the induction coil as shown in Fig. 1, was made, for this sample, at a rate of 0.1 inch per minute. During the pass, dry hydrogen was conducted through the chamber containing the silicon being treated.

After an initial pass, a second pass was made, this time as hydrogen saturated with water vapor was flushed through the apparatus. After the zone had traversed five inches along the total rod length, the source of water vapor was disconnected from the hydrogen line and once more dry hydrogen only was used to flush the silicon sample. The resulting influences of this treatment on silicon resistivity are shown in curve 62. A substantial increase in resistivity, corresponding to a decrease in the concentration of impurities has been brought about. Also, at that point at which water vapor was excluded from the hydrogen atmosphere, a decrease in resistivity, signifying a lowered efficiency in impurity removal, is apparent.

Prior to the measurements which were used to plot curve 63, the same silicon sample used in the previously mentioned experiments was once more zone refined in an atmosphere exclusively of hydrogen, no water vapor being present. No significant improvement in the resistivity value is noticed in curve 63 above that value of the resistivity obtained by the wet hydrogen treatment preceding the measurements of curve 62. Clearly, the presence of water vapor in the ambient atmosphere is beneficial in obtaining a significantly higher degree of purity in the material under treatment.

Curve 64 shows the effect on the silicon resistivity of a second zone-melting treatment using hydrogen saturated at 0° C. with water vapor. Roughly a three-fold increase in resistivity has been brought about by this second water-vapor purification. The water vapor was kept as a component of the atmosphere throughout the entire zone-melting pass in this example.

Finally, in curve 65, changes in the rate of zone travel through the sample were explored to find their effect on the purification, wet hydrogen again being used as the atmosphere. The flat, high-valued initial portion of the resistivity curve resulted from passing the first two inches of the silicon rod through the plane of the induction coil at a rate one-half that used in the other experiments, that is at 0.05 inch per minute rather than at 0.1 inch per minute. At the sharp break in curve 65, the faster rate was again used, resulting in decreased purification and consequently decreased resistivity. The sharp upturn of the resistivity curve for the end of the rod at which the last zones were refined was caused by maintaining one zone, which was fixed by the dimensions of the induction heating coil at 0.25 inch in length, molten for a period of four minutes. The increased time interval during which the molten zone was kept in contact with wet hydrogen thus appears responsible for the increased degree of purification and higher resistivity values observed in the initial and final segments of curve 65 as compared with the central portion in which the usual rate of zone travel was maintained.

In Fig. 7 also, the resistance characteristics of a silicon rod purified using the apparatus of Fig. 1 are shown graphically. The curves show the resistivity of a silicon rod measured in ohm-centimeters and plotted on the ordinate on a logarithmic scale. The units of the abscissa are inches and the variable plotted is the distance from the end of the rod at which a molten zone is started through the rod.

Curve 71 is a plot of the resistivity of a boron-doped rod subjected to an initial zone pass made in dry hydrogen at a zone travel rate of 0.1 inch per minute. The pass, similar to that made before taking the data shown in curve 61 of Fig. 6, was made to "level" the impurity concentration in the rod prior to water vapor treatment. Another zone was then started through the rod 2 inches from the rod end and allowed to move at a rate of 0.05 inch per minute to a position 4 inches from the end of the rod. The subsequently measured resistivity of this portion of the rod is indicated by curve segment 72. Water vapor was then mixed with the hydrogen atmosphere surrounding the rod. The previously dry hydrogen was saturated at minus 18° C. to give a partial water vapor pressure of 0.94-millimeter in the gas mixture. The resultant increase in silicon resistivity, corresponding to a decrease of boron concentration, is shown by the portion 73 of the resistivity curve.

When 7 inches of the rod had been processed, the movement of the molten zone through the rod was stopped for about five minutes while the apparatus was modified to permit saturation of the hydrogen carrier gas with water vapor at a temperature of 0° C. During this time also the new atmosphere, containing a higher vapor pressure of water, was used to flush the apparatus of its previous gaseous contents. This hiatus in zone movement during equilibration, with one molten zone segment being exposed to water vapor for a relatively extended period, led to an increased, time-induced, purification indicated by a sharp peak 76 in the resistivity curve. After equilibrium with the new atmosphere had been reached, movement of the zone at 0.05 inch per minute was reinitiated with a new hydrogen atmosphere containing water vapor at a partial pressure of 4.6 millimeters. Purification brought about by water vapor at this concentration is shown by segment 74 of the plot in Fig. 7.

When roughly 9 inches of the rod had been processed, zone movement was again stopped and the apparatus modified to permit saturation of the hydrogen carrier gas at 11° C. Another peak 77 resulted from the increased time of exposure of a single molten zone to a purifying atmosphere. After about five minutes, zone movement was again begun at a rate of 0.05 inch per minute. The molten zone travelling to the end of the rod was in contact with hydrogen saturated with water vapor at 11° C. The vapor was present at a partial pressure of 9.8 millimeters. This part of the process is indicated by segment 75 of the curve.

The concentration of boron in the silicon can be computed for a given value of the silicon resistivity. Such calculations were made for the resistivities measured on the plateaus 72, 73, 74 and 75 of the plot. The concentrations so calculated were expressed as a ratio $$\frac{(B)}{(B)_0}$$

where $(B)_0$ is the concentration of boron found before water vapor purification, as indicated by the resistivity value denoted 72, and $(B)$ is the concentration of boron in the silicon after treatment with an atmosphere containing a specified partial pressure of water vapor, as indicated by the resistivity value measured at 73, 74, and 75 on the plot.

A plot of $$\log \frac{(B)}{(B)_0}$$

against the square root of the respective vapor pressure values of water used in treating the silicon prior to making the resistivity measurements is linear.

From consideration of the data of Figs. 6 and 7, and other similar plots, direct dependence of the value of the logarithmic purification ratio, $$\log \frac{(B)}{(B)_0}$$

on time and on the square root of the water vapor pressure value can be postulated.

It may further be conjectured that the boron removal mechanism includes a heterogeneous reaction at the molten silicon surface. In consequence, the changes in concentration observed during purification should be directly proportional to the magnitude of the silicon area exposed to the purifying atmosphere, and inversely proportional to the volume of silicon being purified.

An empirical expression for the purification process has been derived from the observations given above. The equation relates the pertinent variables in a manner which fairly well describes the purification mathematically:

$$\log \frac{(B)}{(B)_0} = -K\frac{A}{V}t\sqrt{p}$$

where $(B)$ = boron concentration after purification
$(B)_0$ = initial boron concentration before purification
$K$ = proportionality constant
$A$ = surface area of liquefied silicon exposed to purifying atmosphere
$V$ = volume of liquefied silicon
$t$ = time for which water vapor atmosphere and liquid silicon are contacted
$p$ = partial pressure of water vapor in atmosphere The above proportionality, derived from and substantiated by experiment, appears consistent with the view that the purification is kinetically dependent on a removal mechanism involving an heterogeneous reaction at the melt surface.

Although the kinetics of the removal may be reasonably explained by the above discussion, the equation derived gives little insight into the chemical reactions which occur in the process. The presence of traces of borates in deposits of silicon dioxide found on the inner surfaces of the quartz tube jacket in the apparatus of Fig. 1 seems, however, to confirm the hypothesis that an oxidation of boron by water vapor is occurring, and that the boron is removed from the silicon by evaporation as an oxidized species.

The efficacy of the purification treatment is linked with the volatility, or ease of removal, of the oxidized impurities from the molten matrix. The ease with which such oxidized impurities escape is apparently dependent on their nature and the identity of the matrix material as well as the temperature at which the impurities are to boil off. Thus, the ease with which boron contaminants are removed from silicon by oxidation with water vapor indicates a high volatility for the oxidation product at temperatures between the silicon melting point, approximately 1420° C., and about 1550° C. By escape of the impurity from the reaction zone, an essentially irreversible purification reaction is obtained in the case of boron removal.

With aluminum, the evaporation of oxidation products is less favorable, and an equilibrium between oxidized and unoxidized species is set up in the molten silicon. Some oxidation apparently occurs, but a majority of the original aluminum contaminant remains unaffected. No noticeable effect of the water vapor treatment on phosphorus in silicon has been observed.

The water vapor treatment, then, is most effective in removing boron impurities, and shows effectiveness in partially removing aluminum impurities. By coupling water vapor treatment with a zone refining step, aluminum, phosphorus, and boron may be eliminated as contaminants. Phosphorus impurities, largely unaffected by water vapor treatment alone, can also be removed by liquefying silicon in vacuum, as these impurities are comparatively volatile and will boil from the liquid metal in vacuum.

The observations mentioned above are directly applicable to silicon semiconductor materials. Substantial differences exist between the processes described and the process for purifying germanium taught in the copending application of J. H. Scaff and H. C. Theurer, Serial No. 236,662, earlier mentioned.

Since germanium may be liquefied in crucibles which are composed of chemically reactive materials, such as graphite which may act as a reducing agent, the possibility is presented of controlling an impurity level within the germanium melt by balancing the respective extent of simultaneous oxidation and reduction reactions. Thus, for example, aluminum impurities may be substantially completely oxidized in germanium by exposure of the germanium melt to water vapor. If water vapor is then excluded from the atmosphere over the melt, a reduction of the oxidized aluminum to the metallic impurity is free to occur if the melt is kept in contact with a reducing agent such as the graphite crucibles usually used to contain the melt.

In the silcon refining process, the use of graphite crucibles is not possible as sorption of the molten silicon into the graphite occurs. Non-reactive, non-reducing, non-contaminating containers, such as those made of silica, are used, or the silicon is refined in apparatus, such as that schematized in Fig. 1, which does not rely on containment of the silicon in any vessel.

In silicon, further, aluminum, the impurity easily controlled in germanium, is only partially oxidized by water vapor treatment, as earlier mentioned. An equilibrium system is formed when approximately 16 percent of the aluminum is oxidized. Complete removal by oxidation is not encountered. Also, for the boron removal process, which proceeds very efficiently in silicon refining, the efficiency may be in large part dependent on the escape from the melt of boron impurities as oxidation products. This escape of boron from the reaction zone precludes the possibility of impurity concentration control by opposing reduction reactions as is used in refining germanium.

Returning to consideration of the details of water vapor refinining, as noted before, the removal of boron impurities from silicon is dependent on the square root of the partial pressure of water vapor in contact with the silicon. The melt may be treated with water vapor in a partial vacuum, or may be conveniently treated with a moist neutral gas at atmospheric pressures or higher pressures. Where it is desired also to remove relatively involatile phosphorus compounds, vacuum treatment may be indicated. The lowering of pressure over the melt has been found effective in aiding phosphorus evaporation. Normally, however, the zone refining and normal freezing processes illustrated by Figs. 1, 3, and 4 are done while a neutral gas, preferably hydrogen, containing water vapor surrounds the silicon being refined.

By a neutral gas is meant one for which no undesirable side reactions of interfering magnitude occur. The purification process functions more efficiently when hydrogen is used as a carrier for water vapor than when nitrogen or the rare gases are used. Such a difference indicates that the system is not completely indifferent to the gas used, and that, probably, the gas is not inert in the sense of not, in some way, influencing the process. The neutral gases herein mentioned are intended to be distinguished from gases such as oxygen, chlorine, phosphine or carbon dioxide, which, by extensively oxidizing or contaminating or otherwise actively and competitively reacting with the silicon being purified, might nullify the benefits derived from the water vapor treatment.

While the partial pressure of water vapor in such mixtures with a neutral gas, or even the pressure of water vapor in partial vacuum, may be raised to fairly high values, it has been found convenient to keep the pressures below the equilibrium partial pressures of water vapor over water at room temperatures. Use of pressures higher than about 25 millimeters, which is the vapor pressure of water at 25° C. to 26° C., requires keeping all portions of the gas system above room temperature to avoid condensation. By saturating the gas mixture with water at temperatures below room temperature, no precautions against condensation in lines at room temperature need be taken. Similar considerations apply for partially evacuated systems containing some water vapor. The vapor in the system is best equilibrated with water at a temperature lower than the temperature at any other point in the system. As mentioned, equilibration at temperatures below room temperature is most convenient.

Thus, a water vapor pressure of 4.5 millimeters of mercury is advantageously used in many application of the purification technique. This pressure is the vapor pressure of water at 0° C. In practice, the equilibration is best accomplished by saturating or partially saturating the dry neutral gas used, preferably hydrogen, at room temperature. The moist gas is then passed through a trap at the desired equilibration temperature, conveniently 0° C., with any excess vapors being condensed in the trap. This procedure of first loading a gas with water vapor at a higher temperature, then condensing excess vapor by chilling at the desired equilibrium temperature, assures that the gas will be fully saturated at the equilibrium temperature. Attempting to saturate at the equilibrium point itself may require additional precautions to assure that true equilibrium has been reached and that the gas is, in fact, completely saturated.

Though a convenient upper limit on the saturation temperature might be set at room temperature, then, the most advantageous operating range lies between 0° C. and 11° C. Above 11° C., at which temperatures the equilibrium vapor pressure of water is greater than 9.8 millimeters, the oxidation of silicon occurring simultaneously with the purification reactions may noticeably interfere in the process. The molten silicon surface may become too coated with silicon oxidation products to permit efficient oxidation and removal of unwanted boron. At the low temperature end of the scale, purification has been observed even where equilibration of the moisture content has been made at −18° C., giving a water vapor partial pressure of only 0.94 millimeter. Even lower temperatures and pressures can be used if they afford practical advantage. A balance of convenience and a desire for fairly rapid purification suggest that 0° C. is generally the best temperature for saturation.

If a carrier gas is used in the purification, rather than a water vapor stream in partial vacuum, hydrogen is advantageously employed. Helium or argon are also suitable alternatives, though the use of a high frequency current in the induction coil may give rise to interfering glow discharge phenomena. Nitrogen may be used at high frequencies without the interferences observed for the rare gases. As noted earlier, the purification process appears to be less efficient with these gases, however, than when hydrogen is used as the water vapor carrier.

When hydrogen is used, it may be desirable to remove traces of oxygen from the tank gas. Such removal can be accomplished by passing the hydrogen over palladinized alumina, for example. Condensible impurities in the neutral gases are removed by passage of the stream through a liquid nitrogen trap. Adsorbent charcoal in the trap helps in removing contaminating impurities.

A typical purification and saturation train, in the preferred case using hydrogen, will involve successive passage of the gas stream, then, over a supported catalyst to convert oxygen impurities to water, through a charcoal trap at liquid nitrogen temperatures to condense or adsorb the remaining gaseous contaminants, through a water bubbler conveniently at room temperature where saturation or near saturation is accomplished, and finally through a condensing trap conveniently at 0° C. where excess water vapor is removed from the gas stream. The stream, containing a partial pressure of water of 4.6 millimeters, is then fed to the apparatus holding the molten silicon.

The rate at which the gas is passed over the molten silicon surface is chosen to conform with the rapidity of purification desired by the operator. The partial vapor pressure of water in the atmosphere is of primary importance in affecting the rapidity of purification, and the rate of flow of the gas stream is adjusted at a reasonable value to conform with the water vapor content decided upon. Convenience in handling the gas may be a factor determining flow rate. The magnitude of the surface area of the silicon exposed to the purifying atmosphere and the over-all dimensions of the apparatus in which purification is occurring may also be of importance. No one of the variables here considered is, taken singly, critically determinative of the gas flow rate. One skilled in the art can easily balance the influential factors to accommodate them to his specific practise of the invention.

An extremely slow rate of flow for the purifying atmosphere, or an essentially static atmosphere, may result in localized depletion of water vapor from the gas volume in contact with the molten silicon. Such a decrease in the effective partial pressure of water vapor in the reaction zone would, by essentially removing a requisite reactant, decrease the rate of purification obtainable. On the other hand, an excessively rapid gas flow, while not harmful, would be wasteful and unnecessary.

In the floating zone apparatus depicted in Fig. 1, a rate of flow of moist hydrogen of 1 liter per minute has been found satisfactory. This rate is also advantageously used in the crucible zone melting technique shown in Fig. 3. For the normal freezing crucible process used with the apparatus shown in Fig. 4, flow rates of about 1 liter per minute of moist gas are used both for the gas bubbling through the silicon melt and for the auxiliary gas flow admitted to the silicon surface through a separate inlet. These flow rates have been found to be most convenient for the specific apparatus depicted in the three diagrams mentioned. The presence of water vapor in the exhaust gases is still detectable at the rates mentioned. Other flow rates, higher or lower, would not necessarily be detrimental to the purification processes.

Where moist neutral gas is used as a purifying atmosphere and the purification system is left open to the air at the exhaust vent, sufficient pressure should be maintained on the escaping gas to prevent air from leaking into the system and excessively oxidizing the molten silicon being purified.

The time during which the purifying atmosphere and the melt are kept in contact is governed by the extent to which purification is desired. Other factors being equal, the relation given earlier shows that the logarithm of the ratio of boron concentrations after and before purification is directly proportional to the time during which contact is maintained. When the water vapor process is coupled with other refining steps, the time required for these other steps may be a factor to be considered. As the extent of the purification accomplished by zone refining is linked with the number of zone passes made, concurrent zone refining and water vapor treatment may be continued conveniently through whatever period of time is required for the zone refining step. If boron need not be extensively removed, a dry rather than a moist neutral gas may be used during some portion of the zone refining technique.

Generally speaking, even the shortest contact between the melt and water vapor will result in boron removal. By permitting the contact to continue for a period of hours, as high a degree of boron removal as is desired may be obtained. The rate of flow of moist gas over the melt may also be adjusted with a view to the total amount of time during which treatment is to be continued.

In the apparatus shown in Fig. 4, the passage of hydrogen saturated at 22° C. with water vapor through a silicon melt for three and one-half hours has been observed to convert p-type silicon, of an original resistivity of 0.05 ohm-centimeter, to n-type silicon with a resistivity of 0.03 ohm-centimeter. After a subsequent removal of phosphorus by vacuum zone refining, p-type silicon of 2.5 ohm-centimeter resistivity has been obtained. Such changes, where the water vapor treatment alone is largely responsible for boron removal, can be determined to correspond to a reduction of the original boron concentration from approximately $1(10^{18})$ boron atoms per cubic centimeter to a value of $6.5(10^{15})$ boron atoms per cubic centimeter. A three and one-half hour treatment has thus removed 99.35 percent of the original boron contaminant.

Finally, in the use of water vapor refining, the silicon melt is preferably kept at temperatures between 1420° C. and 1550° C. Temperatures higher than 1550° C. may, however, be reached locally in the interior portions of a melt or ingot being refined. Generally the figure of 1550° C. is often a practical upper limit on the temperatures at which zone-refining or normal freezing processes can be run. Silica apparatus, commonly used when these techniques are practised on silicon, tends to soften at higher temperatures. The water vapor process, used alone or with simultaneous zone-melting or normal freezing, may thus be also limited to temperatures below 1550° C. if apparatus made of silica is employed.

It is to be noted that the method of purification herein described has been found effective for the removal of impurities from silicon even at comparatively low levels of contamination. As typifying such purification, an n-type silicon body of 40 ohm-centimeter resistivity was treated by a combined surface tension zone suspension technique coupled with water vapor treatment. As estimated from the resistivity measurements, the rod, prepared by the hydrogen reduction of silicon tetrachloride, contained boron in an approximate concentration of $0.5(10^{14})$ atoms per cubic centimeter and phosphorus at an approximate concentration of $1.9(10^{14})$ atoms per cubic centimeter. The rod was subjected to two zone passes at a travel rate of 0.05 inch per minute, in apparatus similar to that of Fig. 1, while an atmosphere of hydrogen saturated with water vapor at 0° C. surrounded the rod. This treatment was followed by nineteen zone passes in dry hydrogen: ten at a travel rate of 0.2 inch per minute and nine at a travel rate of 0.1 inch per minute. The resulting silicon, from which boron had been largely removed by the water vapor treatment and phosphorus by the subsequent zone passes in dry hydrogen, was p type, with a resistivity of 3000 ohm-centimeters. The boron and phosphorus concentrations in the refined material were determined by low-temperature Hall effect measurements to be about $4.3(10^{12})$ atoms per cubic centimeter and $3(10^{11})$ atoms per cubic centimeter, respectively. This is the purest silicon known to the inventor to have been so far produced.

It should be understood that, as changes and variations may be made in the invention described above without departing from the scope and spirit of the invention, the embodiments and examples of the invention given herein are illustrative only and should not be construed as being limiting in any manner.

What is claimed is:

1. The method of refining silicon which comprises establishing a molten zone in a mounted silicon body, the size of said zone being such that surface tension forces in the zone keep the silicon body integral, and advancing said molten zone through said silicon body while producing a flow of a neutral atmosphere comprising water vapor having a partial pressure of from about 0.94 millimeter of mercury to about 25 millimeters of mercury over the surface of the said molten zone so as to produce intimate contact therewith.

2. The method as described in claim 1 for which the partial pressure of water vapor in said neutral atmosphere is about 5 millimeters of mercury.

3. The method as described in claim 1 in which said neutral atmosphere consists of a mixture of hydrogen and water vapor, the partial pressure of said water vapor being about 5 millimeters of mercury.

4. The method of refining silicon which comprises liquefying a silicon mass, maintaining said mass at a temperature between 1420° C. and 1550 C., passing a gaseous mixture of hydrogen and water vapor through said molten silicon till the silicon has been purified to the extent desired, said water vapor having a partial pressure of from about 0.94 millimeter of mercury to about 25 millimeters of mercury and then directionally solidifying the molten silicon by a slow progression of a solid-liquid interface, first formed at one end of the mass, throughout the remaining melt.

5. The process as described in claim 4 for which said mixture of hydrogen and water vapor contains water vapor at a partial pressure of about 5 millimeters of mercury.

6. The method of refining silicon which comprises establishing at least one molten zone in a silicon body, advancing said molten zone through said body by fusion of solid silicon at the leading solid-liquid interface of the zone and by recrystallization of molten silicon at the trailing solid-liquid interface of the zone, while producing a flow of atmosphere comprising water vapor, said water vapor having a partial pressure of from about 0.94 millimeter of mercury to about 25 millimeters of mercury past the surface of the said molten zone so as to produce intimate contact therewith.

7. The method of claim 6 in which the said atmosphere is partially evacuated.

8. The method of claim 6 in which the said atmosphere consists essentially of said water vapor together with at last one neutral gas.

9. The method of claim 8 in which the said neutral gas is hydrogen.

10. The method of refining silicon which comprises bubbling a gas through a mass of molten silicon, said gas comprising water vapor having a partial pressure of from about 0.94 millimeter of mercury to about 25 millimeters of mercury.

References Cited in the file of this patent
UNITED STATES PATENTS

| | | |
|---|---|---|
| 2,402,582 | Scaff | June 25, 1946 |
| 2,631,356 | Sparks et al. | Mar. 17, 1953 |
| 2,739,088 | Pfann | Mar. 20, 1956 |